(12) United States Patent
Berreyesa

(10) Patent No.: US 9,067,840 B1
(45) Date of Patent: Jun. 30, 2015

(54) ORGANIC PLANT NUTRIENT

(71) Applicant: Dandelion Enterprises, LLC, Occidental, CA (US)

(72) Inventor: Max Berreyesa, Occidental, CA (US)

(73) Assignee: Dandelion Enterprises, LLC, Santa Rosa, CA (US)

( * ) Notice: Subject to any disclaimer, the term of this patent is extended or adjusted under 35 U.S.C. 154(b) by 184 days.

(21) Appl. No.: 13/970,834

(22) Filed: Aug. 20, 2013

Related U.S. Application Data

(60) Provisional application No. 61/691,488, filed on Aug. 21, 2012.

(51) Int. Cl.
*C05G 3/00* (2006.01)

(52) U.S. Cl.
CPC .................................... *C05G 3/00* (2013.01)

(58) Field of Classification Search
USPC ........................................................ 504/144
See application file for complete search history.

(56) References Cited

U.S. PATENT DOCUMENTS

| 3,940,257 A * | 2/1976 | Sherwin et al. ................... 71/23 |
| 5,201,930 A | 4/1993 | Campbell |
| 2004/0011101 A1 | 1/2004 | Newton |
| 2009/0266125 A1 | 10/2009 | Doan |

FOREIGN PATENT DOCUMENTS

EP 0152685 8/1985

OTHER PUBLICATIONS

Marek et al.,2010, Plant Methods,6:21, pp. 1-7 http://www.plantmethods.com/content/6/1/21.*

* cited by examiner

*Primary Examiner* — Janet Epps-Smith
*Assistant Examiner* — Courtney Brown
(74) *Attorney, Agent, or Firm* — Knechtel, Demeur & Samlan

(57) ABSTRACT

A method of making an organic plant nutrient useful for plants and commercial crops. The method comprises mixing pieces of tree bark which contain salicylic acid in water until the desired level of salicylic acid leaches from the pieces of tree bark to create a concentrated solution of salicylic acid. Then ascophyllum nodosum powder is added to the solution and the solution is aerated. The used bark is removed and the solution strained to produce the plant nutrient.

15 Claims, No Drawings

ORGANIC PLANT NUTRIENT

CROSS-REFERENCE TO RELATED APPLICATION

This patent application is a non-provisional application claiming priority from U.S. Provisional Patent Application Ser. No. 61/691,488 entitled "Organic Plant Nutrient" filed on Aug. 21, 2012, and is fully incorporated herein by reference.

FIELD OF THE INVENTION

This invention relates to and is applicable to horticulture, organics, organic vineyards, growth and maintenance of grape vines and grafting; farming, botany, flower gardening, industrial and commercial farming, medical cannabis, medicinal herbs, landscape plant maintenance and development, heirloom gardening, commercial nurseries, the orchid industry, the hydroponic/aeroponic industry, and hobbyist gardening; and organic and non organic food production crops.

BACKGROUND OF THE INVENTION

From the beginning of mankind, man has continually tried to improve the growth of plants and the yields generated from food crops. Various fertilizers have been used in conjunction with various methods of application of fertilizers and methods of planting. The inventive product addresses numerous issues including but not limited to the following: the lack of time in commercial food crop production to produce a mature plant, complications involved in caring for plants as far as time constraints and nutrient/food usage, vulnerability towards pests and pathogens, fragile roots and foliage, and lack of sustainability of food production crops in harsh environments. In addition, other problems arise when commercial farms and nurseries transplant crops with plants going into shock for weeks prior to growth. Furthermore plants lack natural defenses from systemic acquired response ("SAR"), and suffer from the time constraints involved in root development of cuttings and clones.

Others have tried to solve this problem in the past by the use of harsh chemicals and/or micronutrients that contain large amounts of salts that are non-organic in nature and leave harsh trace chemicals in the soil, leaving the soil non-reusable. Pesticides and numerous other nutrients that require multiple applications and treatment in order to maintain plant health and defense systems have also been used. These micronutrients are developed to help the plants build strong root systems and stout foliage as well as aid in its defenses against pests and pathogens.

The prior solutions failed to completely solve the problems of the past. While others have found ways to speed up food crop production, they have failed to do so in a sustainable, environmentally-friendly way. Non-organic harsh nutrients and pesticides make food production crops unsafe for human consumption. Other nutrients and pesticides need multiple applications in order to be effective. Surrounding environments are polluted by harsh chemicals, leading to inability to reuse the soil, and also contaminating the groundwater that is often used for irrigation and drinking purposes. These consequences that affect the ecosystem are irreversible and everlasting. Other solutions have failed to create a synthetic or organic product that boosts the plants natural defenses or SAR response. They have also failed to create products that require minimal, simple applications which lead to costly plant maintenance. Others have viewed individual issues involved in plant propagation distinctively rather than holistically, which has led to the need for many products rather than a single product that addresses all of the issues.

These problems have not been solved by past attempts for numerous reasons including: A product which is organic and solves these problems is difficult to produce from raw materials. It is easier to produce chemical nutrients that turn a greater profit. The prior art products address individual problems instead of a solution that addresses multiple issues. It is more cost-effective and profitable to sell multiple nutrients than a single, holistic product. Also the past products that are offered for sale show a lack of sensitivity to the environmental issues caused by chemicals that are not naturally derived.

OBJECTS AND ADVANTAGES

An advantage of the inventive product is that when applied, it creates rapid root growth and accelerates the plant's photosynthesis of foliage and/or overall structure. It also boosts the overall health of the plant by strengthening its SAR response against pests and pathogens. This singular product is an advantage over the prior art products which may accelerate root growth or strong foliage or defenses against pests or pathogens, but do not have all three benefits in one product. Another advantage is that the time of production and growth of food and nursery crops is reduced while still improving the maximum yield. When cuttings were taken, rapid root growth was seen within a matter of days. While roots grow on cuttings, the plant also continues to develop stout green foliage. This is an advantage over other products which may encourage root growth in cuttings, but often do not encourage plant growth at the same time. Another advantage of the inventive product is that when applied to plants being transplanted, it kept the plant from going into shock and prevented loss of valuable plant production time. It has also been shown to keep plants healthy and strong while obtaining the maximum yield while growing food production or ornamental crops in harsh environments, thus solving the problems of maintaining plants overall health, root growth, photosynthesis, and SAR response. Other products that speed up plant growth do not always encourage maximum yield or overall plant health.

Another object is to provide a product that instills plant vigor within a matter of days after the initial application. This is an advantage over other products that may not show immediate results and require continued usage in order to maintain plant health. Yet another object is to provide a product that has shown to be effective as a root drench, foliar spray, and in hydroponic and aeroponic systems. This is an advantage over other products that cannot be applied in numerous systems with positive results. Yet another object is to provide a product that may be applied as often as the farmer/gardener wishes and only bestows more health and abundance, while other products are often so high in nitrogen content that they cause irreversible damage when overused. An advantage of the inventive product is that it is nearly impossible to misuse.

Still another object is to provide a product that addresses multiple problems involved with growing plants throughout the entire life cycle. An advantage of applicant's invention is that the product is 100% organic, meaning no salts and no pollutants or toxins. It cannot be overused and will not have negative effects on the environment or on the plant if used more often than necessary. Additional advantages of the inventive product are that excessive usage has only proven to improve overall success and yield. It is user-friendly and easy to apply with multiple application options. Other products do not provide the four benefits that the inventive product provides.

SUMMARY OF THE INVENTION

The inventive product is naturally derived from combined salicylic acid and ascophyllum nodosum with purified water to create an organic, multi-functional, minimal application plant nutrient which creates the healthy rapid growth of the root systems and causes excelled photosynthesis in leaves, leading to stout green foliage and stronger overall plant structure to which results in maximum yield and maximizes overall stability. The inventive product boosts the plants natural defense and SAR response against pests and pathogens rather than temporarily reducing plant vulnerability. Minimal application causes plants to produce more of its own natural antibodies throughout its entire growth cycle. The inventive product is usable on food crops, ornamental and specialty plants, and medicinal herbs grown for holistic healthcare.

The inventive product can change agricultural food production for generations to come. It will not only boost food production for a world that is lacking and depleting its natural resources, but will save the environment at the same time.

DESCRIPTION OF THE PREFERRED EMBODIMENT

Preparation of the Inventive Product

Step 1.

Begin by harvesting willow or birch. Saplings contain the highest amount of salicylic acid, however any part of these plants are acceptable to use. Take willow or birch branches and cut into ½ inch pieces or run through a chipper. Soak 1-20 cups of willow or birch per 1 gallon of purified water at room temperature, or at an elevated temperature. The higher the temperature of the purified water the faster the salicylic acid will leach from the raw willow or birch material into the water. It is preferred that extraction be performed between 50-120 degrees Fahrenheit. Allow extraction to take place between 1-10 weeks so that the extracted salicylic acid is concentrated enough to use for solution. The longer it soaks the stronger it becomes. It is very important but not needed that while the extraction process is taking place there needs to be multiple air stones in the tank as well as two circulator pumps circulating the solution at all times to create constant aeration and movement which aids in the extraction process, and keeps unwanted microbes from growing. After the extraction process is complete, separate the salicylic acid extraction from the raw used plant material by pumping the liquid into a second tank, filtering it through a fine mesh screen to catch any small pieces of matter. Then discard the used willow or birch matter.

The following plants contain salicylic acid and can be used in the process: sweet birch, white birch, meadow sweet or other plants belonging to the genus *Spiraea*, wintergreen, white willow and black poplar. Other plants containing salicylic acid can also be used.

Step 2.

Mix 1-10 teaspoons (1.25 grams to 10.25 grams) of ascophyllum nodosum (water soluble powder), per 1 gallon of salicylic acid extraction prepared in accordance with Step 1 above. Aerate the two compounds together for one to twenty-five days. The solution is ready to be bottled for use. Once bottled the solution is best kept in a cool area.

First Alternative Formula:

Place 1-10 teaspoons of ascophyllum nodosum into a bag with super fine mesh (similar to a tea bag) and place the bag or bags in a gallon of salicylic extract, which is prepared in accordance with the preferred embodiment described in Step 1 above. The amount of ascophyllum nodosum used depends on the desired strength. However the ratio will be 1-10 teaspoons of ascophyllum nodosum per gallon of salicylic extract. Leave the ascophyllum nodosum to leach out into the salicylic extract, while at the same time being aerated and with water being circulated through the solution.

After about 1-20 weeks removes the ascophyllum nodosum bag or bags from the salicylic solution and dispose of the bag or bags and any of the raw used plant material that may be remaining. The solution is then ready for use.

Second Alternative Formula:

Prepare the salicylic extract as described in Step 1 above. Then place the salicylic extract in bottles and add the proportionate amount of ascophyllum nodosum (water soluble powder) to the bottle and seal. The ascophyllum nodosum will disburse into the solution over time. This alternative method using ascophyllum nodosum speeds up production of the inventive product.

Third Alternative Formula:

This alternative provides for the preparation of a synthetic inventive product mixture. The process provides for adding 1-10 grams of synthetic
salicylic acid powder crystallized or non-crystallized to 1 gallon of purified water at room temperature depending on the desired strength. Aerate with air-stones and circulatory pump. Then add 1-10 teaspoons depending on desired strength of synthetic form or non-organic ascophyllum nodosum.

Let mix for 24 hours and then bottle. The product is ready for production and application.

The compounds used in the process are believed to be beneficial for the following reasons.

A. salicylic acid aids in rapid and healthy root production and maintains that health.

B. ascophyllum nodosum, combined with salicylic acid, accelerates photosynthesis and stoutness of stalks and foliage due to its combination of both macronutrient, (e.g. N, P, K, Ca, Mg, S) and micronutrients (e.g. Mn, Cu, Fe, Zn, etc.). It also is a host to cytokinins, auxin-like gibberellins, betaines, mannitol, organic acids, polysaccharides, amino acids, and proteins which are all very beneficial and widely used in agriculture.*

C. salicylic acid boosts SAR response in plants, aiding their natural defenses against pests and pathogens Test Results.

The inventive product, when applied, created rapid root growth and accelerated plant's photosynthesis of foliage and/or overall structure. It also boosts the overall health of the plant by strengthening its SAR response against pests and pathogens. The time of production and growth of food and nursery crops is cut down while still improving the maximum yield. When cuttings were taken, rapid root growth was seen within a matter of days. While roots grow on cuttings, the plant also continues to develop stout green foliage. It was also applied to plants being transplanted, keeping the plant from going into shock and preventing loss of valuable plant production time. It has also been shown to keep plants healthy and strong while obtaining the maximum yield while growing food production or ornamental crops in harsh environments, thus solving the problems of maintaining plants overall health, root growth, photosynthesis, and SAR response. Overwhelming plant vigor can be seen within a matter of days after the initial application. This product has been tested and has shown to be effective as a root drench, foliar spray, and in hydroponic and aeroponic systems.

Thus there has been provided an organic plant nutrient and method of making the same that fully satisfies the objects set forth above. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method of making an organic plant nutrient comprising the steps of:
    providing 1-20 cups of pieces of tree bark which contain salicylic acid per gallon of water;
    soaking the pieces of tree bark in the water until the desired level of salicylic acid leaches from the pieces of tree bark then to a concentrated solution of salicylic acid;
    mixing between 1-20 teaspoons of ascophyllum nodosum powder per gallon to the concentrated solution of salicylic acid; and
    aerating the ascophyllum nodosum and salicylic acid solution to produce the organic plant nutrient.

2. The method claim 1 and the further step of circulating the ascophyllum nodosum and salicylic acid solution while it is being aerated.

3. The method of claim 2 and the further step of removing the pieces of tree bark and filtering the remaining solution.

4. The method of claim 1 and the additional step of circulating the tree bark water solution during the leaching process.

5. The method of claim 4 and the added step of aerating the tree bark water solution during the leaching process.

6. The method claim 1 wherein the tree bark is selected from the group consisting of birch, meadow sweet, wintergreen, willow and poplar.

7. The method of claim 1 wherein the tree bark is soaked in the water from one to twenty weeks.

8. A method of making an organic plant nutrient comprising the steps of:
    providing 1-20 cups of pieces of tree bark which contain salicylic acid per gallon of water;
    soaking the pieces of tree bark in the water until the desired level of salicylic acid leaches from the pieces of tree bark then to a concentrated solution of salicylic acid;
    placing ascophyllum nodosum powder in a fine mesh bag and placing the bag in the concentrated solution of salicylic acid solution;
    aerating the concentrated solution with the fine mesh bag for at least about one week;
    removing the bag and any tree bark from the solution.

9. The method of claim 8 and the additional step of circulating the tree bark water solution during the leaching process.

10. The method of claim 9 and the added step of aerating the tree bark water solution during the leaching process.

11. The method claim 1 wherein the tree bark is selected from the group consisting of willow and birch.

12. A method of making an organic plant nutrient comprising the steps of:
    providing 1-20 cups of pieces of tree bark which contain salicylic acid per gallon of water;
    soaking the pieces of tree bark in the water until the desired level of salicylic acid leaches from the pieces of tree bark then to a concentrated solution of salicylic acid;
    removing the bark;
    placing the concentrated solution in bottles;
    placing ascophyllum nodosum powder in the bottle and closing the bottle allowing the ascophyllum nodosum powder to disburse into the solution.

13. The method of claim 12 and the additional step of circulating the tree bark water solution during the leaching process.

14. The method of claim 12 and the added step of aerating the tree bark water solution during the leaching process.

15. The method claim 12 wherein the tree bark is selected from the group consisting of willow and birch.

* * * * *